(12) United States Patent
Otagaki et al.

(10) Patent No.: US 7,340,041 B2
(45) Date of Patent: Mar. 4, 2008

(54) TELEPHONE DEVICE HAVING OPERATION FUNCTION BY VOICE INPUT

(75) Inventors: Hiroyuki Otagaki, Tottori (JP); Hirotomo Ozaki, Tottori (JP); Shigetoshi Matsubara, Tottori (JP); Kazushi Honjo, Tottori (JP); Tatsuji Kishida, Tottori (JP); Koichi Takata, Tottori (JP); Atsumi Kakimoto, Tottori (JP); Hideyuki Arimoto, Tottori (JP); Satoru Moriyama, Tottori (JP)

(73) Assignees: Sanyo Electric Co., Ltd., Moriguchi-shi (JP); Tottori Sanyo Electric Co., Ltd., Tottori-shi (JP)

( * ) Notice: Subject to any disclaimer, the term of this patent is extended or adjusted under 35 U.S.C. 154(b) by 473 days.

(21) Appl. No.: 10/416,169

(22) PCT Filed: Nov. 16, 2001

(86) PCT No.: PCT/JP01/10066

§ 371 (c)(1),
(2), (4) Date: May 16, 2003

(87) PCT Pub. No.: WO02/41610

PCT Pub. Date: May 23, 2002

(65) Prior Publication Data
US 2005/0100141 A1 May 12, 2005

(30) Foreign Application Priority Data

Nov. 17, 2000 (JP) .............................. 2000-351548
Nov. 17, 2000 (JP) .............................. 2000-351549
Nov. 17, 2000 (JP) .............................. 2000-351550
Nov. 20, 2000 (JP) .............................. 2000-353116

(51) Int. Cl.
*H04M 1/64* (2006.01)

(52) U.S. Cl. .................................... 379/88.01; 455/563
(58) Field of Classification Search ............. 379/88.01, 379/88.02, 88.03, 88.04; 704/231, 246, 270, 704/275
See application file for complete search history.

(56) References Cited

U.S. PATENT DOCUMENTS

| 5,231,691 | A | * | 7/1993 | Yasuda ........................ 704/200 |
| H1646 | H | * | 5/1997 | Kato et al. .............. 379/355.06 |
| 5,651,056 | A | * | 7/1997 | Eting et al. ............... 379/88.01 |
| 6,263,216 | B1 | * | 7/2001 | Seydoux et al. .......... 379/88.03 |
| 6,314,166 | B1 | * | 11/2001 | Laurila et al. ............ 379/88.03 |
| 6,324,513 | B1 | * | 11/2001 | Nagai et al. .................. 704/275 |
| 6,370,506 | B1 | * | 4/2002 | Ahluwalia ................... 704/275 |
| 6,785,366 | B1 | * | 8/2004 | Nobuta et al. ............ 379/88.03 |
| 7,143,039 | B1 | * | 11/2006 | Stifelman et al. ........... 704/270 |

FOREIGN PATENT DOCUMENTS

JP 62-91047 4/1987

(Continued)

OTHER PUBLICATIONS

Notification of Reason(s) for Refusal dispatch date Jul. 4, 2006.

*Primary Examiner*—Fan Tsang
*Assistant Examiner*—Simon Sing
(74) *Attorney, Agent, or Firm*—Westerman, Hattori, Daniels & Adrian, LLP.

(57) ABSTRACT

When a hook detection unit (18) detects the off-hook of a handset (8), voice (e.g., "telephone book", the other party's name) sent from a user is input via the handset (8), and a voice recognition unit (110) recognizes the voice, the other party's name and a telephone number stored in a telephone book memory (3) are displayed on a display unit (5). Then, when voice "up/down" is input via the handset (8), another party's name and a telephone number stored in a telephone book memory (3) are switched and displayed on a display unit (5); and when voice "telephone" or "fax" is input, a call is made or a fax transmission started to the other party displayed on the display unit (5).

7 Claims, 11 Drawing Sheets

FOREIGN PATENT DOCUMENTS

| | | |
|---|---|---|
| JP | 62-091047 | 4/1987 |
| JP | 63-236451 | 10/1988 |
| JP | 63-269652 | 11/1988 |
| JP | 1-92800 | 4/1989 |
| JP | 01-092800 | 4/1989 |
| JP | 03-20566 | 2/1991 |
| JP | 3-20566 | 2/1991 |
| JP | 05-316189 | 11/1993 |
| JP | 5-316189 | 11/1993 |
| JP | 11-261683 | 9/1999 |

* cited by examiner

TELEPHONE DEVICE HAVING OPERATION FUNCTION BY VOICE INPUT

TECHNICAL FIELD

The present invention relates to a telephone apparatus having a function of operating it by voice input and to a telephone apparatus with an excellent operability through the use of voice recognition technology.

BACKGROUND ART

Telephone apparatus currently in wide use at general homes include, for example, a telephone apparatus with an answering function, a cordless phone in which a handset is independent from the main telephone body, or the like.

In order to originate a call with these telephone apparatus, there are some general ways; pushing numbers of dial keys with a handset off-hook; or instructing to originate a call by making the handset off-hook or pushing a certain key after the desired telephone number is selected with the use of function keys such as jog dial from a plurality of telephone numbers previously stored in a telephone book memory (e.g. JP 199309/1993 A).

In a case where a call is originated without using the familiar numeric keypad, specifically, in a case where a call is originated by selecting a telephone number stored in a telephone book memory, even though the telephone book memory is a very convenient function, it often happens that some technologically illiterate people can not make full use of the function because of its troublesome operability.

Consequently a method of detecting telephone numbers previously stored in the telephone book memory with voice input through the handset has been considered. In the method, however, the handset is used for an aim other than a phone conversation, which requires a measure to deal with incoming calls while searching the telephone number.

It is an object of the present invention to solve the problems as expressed above and to provide a telephone apparatus with an excellent operability.

DISCLOSURE OF INVENTION

A present invention is made to solve such problems and characterized by comprising a transmitting/receiving device, voice recognition means for recognizing voice input from the transmitting/receiving device, hook detection means for detecting a hook state of the transmitting/receiving device, and control means for controlling operations of recognizing voice performed by the voice recognition means, wherein the control means controls the voice recognition means to start recognizing input voice in response to an off-hook of the transmitting/receiving device detected by the hook detection means.

Further the present invention is characterized by comprising a telephone book memory capable of storing a plurality of data of other party, display means capable of displaying the data of other party stored in the telephone book memory, and display control means for controlling contents to be displayed on the display means, wherein the display control means causes the display means to select data of the other party in the telephone book memory and to display the data on a basis of a result of recognizing first voice input from the transmitting/receiving device and recognized by the voice recognition means.

The present invention may be structured so that when the voice recognition means recognizes second voice input from the transmitting/receiving device in a state where data of the other party are being displayed on the display means, the display control means switches the data of the other party displayed on the display means to the other data of the other party.

Further the present invention comprises information detection means for detecting information of the other party which is transmitted through a telephone channel upon an arrival of an incoming call, and may be structured so that when the information detection means detects information of the other party while the display means is displaying the other party's data to select, the display means displays the detected information of the other party.

According to the structure, users can execute a telephone book search, calling operation and so on only by having a handset off-hooked and inputting voice, thereby providing a device without troublesome operations, but with an excellent operability.

Also the present invention comprises storing means for storing first setting information indicating whether the voice recognition means starts recognizing voice when the hook detection means detects the off-hook of the transmitting/receiving device, setting change means for changing the first setting information stored in the storing means, and input means for inputting an instruction for changing the setting to the setting change means, and may be structured so that the setting change means changes the first setting information stored in the storing means when the input means inputs an instruction for changing the setting.

According to the above-mentioned structure, users can easily set a mode of voice recognition at their choice and conventional settings for inputting telephone numbers to have a telephone conversation.

Also this invention comprises dial means for originating a call with a dial and may be structure so that when the voice recognition means recognizes third voice input from the transmitting/receiving device in a state where the other party's data are being displayed on the display means, the dial means originates a call with the dial in accordance with the other party's data displayed on the display means.

According to the above-mentioned structure, users can execute calling operations and so on only by inputting voice.

Further the present invention comprises a second storing means for storing second setting information indicating whether the voice recognition means recognizes at least the third voice when first setting information indicating that the voice recognition means starts recognizing voice is stored in the first storing means, second setting change means for changing second setting information stored in the second storing means, and may be structured so that the second setting change means changes the second setting information stored in the second storing means when the input means input an instruction for changing the setting.

The telephone apparatus with a function of operating it by voice input of the present invention is characterized by comprising a transmitting/receiving device, voice recognition means for recognizing voice input from the transmitting/receiving device, hook detection means for detecting a hook state of the transmitting/receiving device, and switch means for switching and connecting the transmitting/receiving device to the voice recognition means or a telephone channel, wherein the voice recognition means is connected with the transmitting/receiving device as well as starting recognizing voice in response to an off-hook of the transmitting/receiving device detected by the hook detection means.

Also the present invention is characterized in that the voice recognition means is separated from the transmitting/receiving device as well as stopping recognizing voice when the transmitting/receiving device is on-hook.

According to the above-mentioned structure, user can execute telephone book search, calling operation and so on by only having a handset off-hooked and inputting voice.

The telephone apparatus with a function of operating it by voice input of the present invention is characterized by comprising incoming call detection means for detecting an incoming call from a telephone channel, other party's information detection means for detecting other party's information transmitted through the telephone channel upon an arrival of an incoming call, a telephone book memory capable of storing a plurality of other party's data, display means, a transmitting/receiving device, hook detection means for detecting a hook state of the transmitting/receiving device, voice recognition means for recognizing voice input from the transmitting/receiving device, switch means for connecting the transmitting/receiving device and the voice recognition means. The voice recognition means is connected with the transmitting/receiving device by the switch means in response to an off-hook of the transmitting/receiving device detected by the hook detection means, as well as starting recognizing voice. The display means selectively displays the other party's data stored in the telephone book memory in response to the voice recognized by the voice recognition means. The voice recognition means stops recognizing voice in response to an incoming call detected by the incoming call detection means while the other party's data are being displayed selectively. When the other party's information is detected by the other party's information detection means, the display means displays the detected other party's information.

As described above, the voice recognition means in this invention stops voice recognition process if a call arrives from the telephone channel during voice recognition so that the user can respond the call. Such structure gives higher priority to the incoming call than voice recognition process. To place higher priority on the incoming call than voice recognition provides users more usability because users can originate a call at users' convenient but can respond an incoming call only when the call arrives.

Also the present invention is characterized by comprising operation means for setting a setting of voice recognition, a transmitting/receiving device, voice recognition means for recognizing voice input from the transmitting/receiving device, detection means for detecting a state of operation means, and control means for controlling operations of recognizing voice performed by the voice recognition means, wherein the control means causes the voice recognition means to start or stop the voice recognizing process depending on the state of the operation means.

Further the control means causes the voice recognition means to stop the voice recognizing process in accordance with an operation by the operation means while voice input from the transmitting/receiving device is being recognized.

In such structure, if key entry is found during recognizing voice, voice recognition is stopped to give priority to the key entry.

Also the present invention is characterized by comprising a transmitting/receiving device, voice recognition means for recognizing voice input from the transmitting/receiving device, a telephone book memory capable of storing a plurality of other party's data, display means capable of displaying the other party's data stored in the telephone book memory, instruction means for instructing an operation corresponding to the other party's data displayed on the display means. The other party's data stored in the telephone book memory is switchable to be displayed on the display means on a basis of a result of recognizing voice by the voice recognition means. The voice recognition means stops the voice recognizing process on a basis of an operation instructed by the instruction means while the voice recognition means is recognizing voice. The other party's data displayed on the display means are handled on a basis of the instruction from the instruction means.

The telephone apparatus with a function of operating it by voice input wherein the instruction means instructs to switch over the other party's data displayed on the display means or to originate a call.

According to the above-mentioned structure, if key entry is found during voice recognition, the voice recognition is stopped to give priority to the key entry. Thus, even if the user presses keys without his/her being aware that voice recognition is operating, the user can execute operations corresponding to the pressed keys without reentry of voice.

Also the present invention is characterized by comprising operation means, a transmitting/receiving device, off-hook detection means for detecting an off-hook of the transmitting/receiving device, voice recognition means for recognizing voice input from the transmitting/receiving device, switch means for connecting the transmitting/receiving device and the voice recognition means. When the off-hook detection means detects the off-hook of the transmitting/receiving device, the switch means connects the voice recognition means to the transmitting/receiving device and causes the voice recognition means to start recognizing voice. The switch disconnects the voice recognition means from the transmitting/receiving device on a basis of the operation of the operation means while the voice recognition is operating.

The voice recognition means may be structured so as to stop voice recognizing process on a basis of the operation of the operation means while the voice recognition is operating.

According to the above-mentioned structure, if key entry is found during voice recognition, the voice recognition is stopped to give priority to the key entry. Even if the user pressed keys without his/her being aware that voice recognition is operating, the user can execute operations corresponding to the pressed keys without reentry of voice.

Also the present invention is characterized by comprising a transmitting/receiving device, voice recognition means for recognizing voice input from the transmitting/receiving device, means for detecting an incoming call from a telephone channel, control means for controlling voice recognition process of the voice recognition means. The control means stops the operations of recognizing voice performed by the voice recognition means in response to an incoming call from the telephone channel detected by the detection means while the voice recognition means is recognizing voice input from the transmitting/receiving device.

When an incoming call arrives during voice recognition, as mentioned above, the apparatus suspends recognizing voice and enters a state where the user can response the incoming call, thereby the user can respond the incoming call without fail.

Also the present invention is characterized by comprising a transmitting/receiving device, voice recognition means for recognizing voice input from the transmitting/receiving device, means for detecting an incoming call from a telephone channel, hook detection means for detecting a hook state of the transmitting/receiving device, means for detecting an incoming call from a telephone channel, means for informing of the incoming call, control means for controlling operations of recognizing voice performed by the voice recognition means. When the incoming call detection means detects an incoming call while the hook detection means detects the off-hook of the transmitting/receiving device and the voice recognition means is recognizing voice input from the transmitting/receiving device, the control means stops the operations of recognizing voice performed by the voice recognition means and the means for informing of the incoming call informs of an arrival of the incoming call.

Further the present invention is characterized by comprising a transmitting/receiving device, voice recognition means for recognizing voice input from the transmitting/receiving device, incoming call detection means for detecting an incoming call from a telephone channel, off-hook detection means for detecting an off-hook of the transmitting/receiving device, switch means for connecting the transmitting/receiving device and the voice recognition means. The switch means connects the voice recognition means to the transmitting/receiving device in accordance with an off-hook of the transmitting/receiving device detected by the off-hook detection means and causes the voice recognition means to start recognizing voice. The switch means disconnect the voice recognition means from the transmitting/receiving device when the incoming call detection means detects an incoming call while voice recognition is operating.

Further the present invention comprises identifying means for identifying information of calling party sent from the telephone channel upon an arrival of a call. The calling party information identifying means may be structures so as to start identifying in response to the call detected by the incoming call detection means.

When an incoming call arrives during voice recognition, as mentioned above, the apparatus suspends recognizing voice and enters a state where the user can response the incoming call, thereby the user can respond the incoming call without fail. If a call arrives during voice recognition, the voice recognizing process is immediately suspended and the user is informed of the incoming call, thereby providing a telephone apparatus with good usability.

BEST MODE FOR CARRYING OUT THE INVENTION

Figure 1:
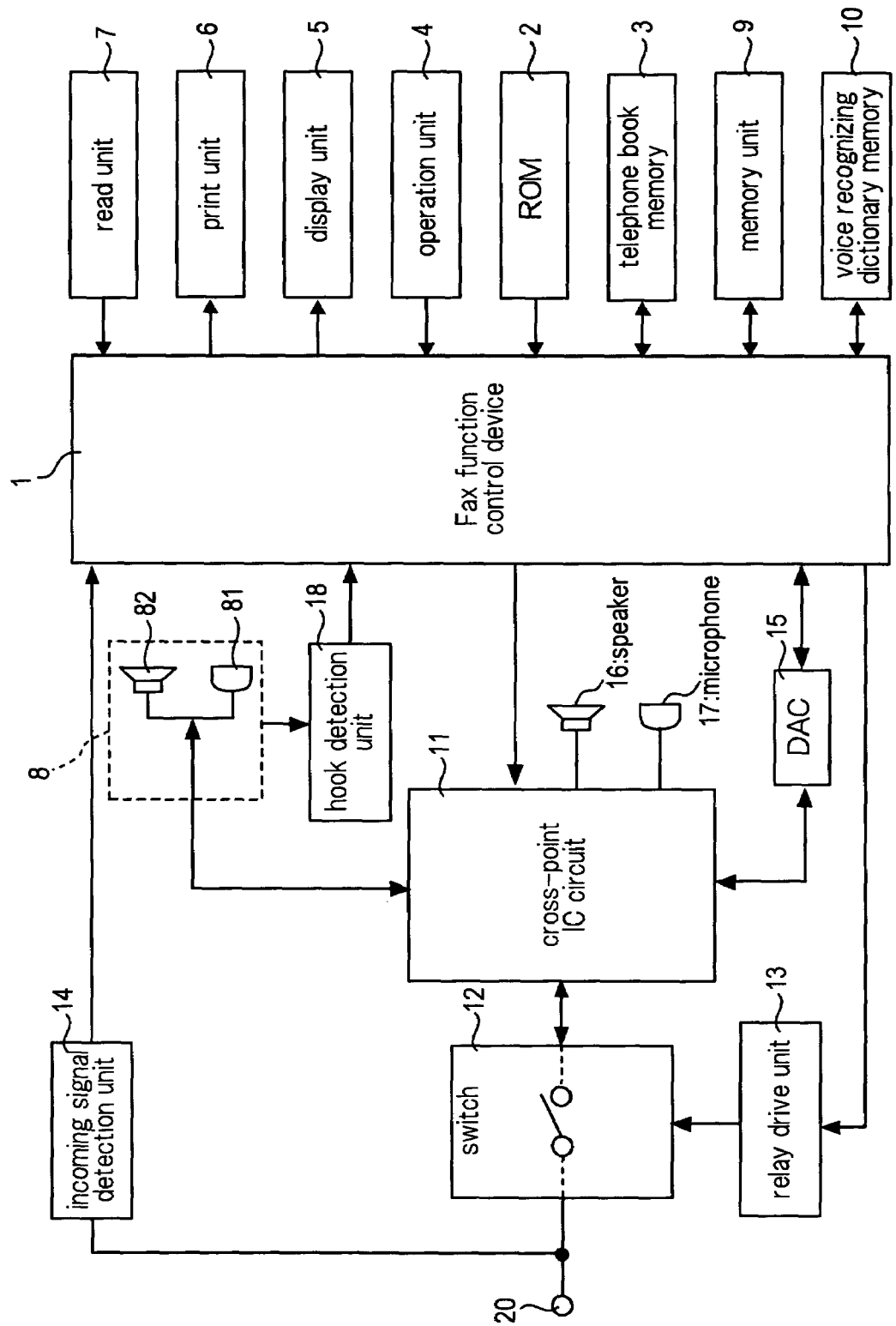
FIG. 1 is a block diagram illustrating a whole structure of an embodiment applying the present invention.
Figure 2:
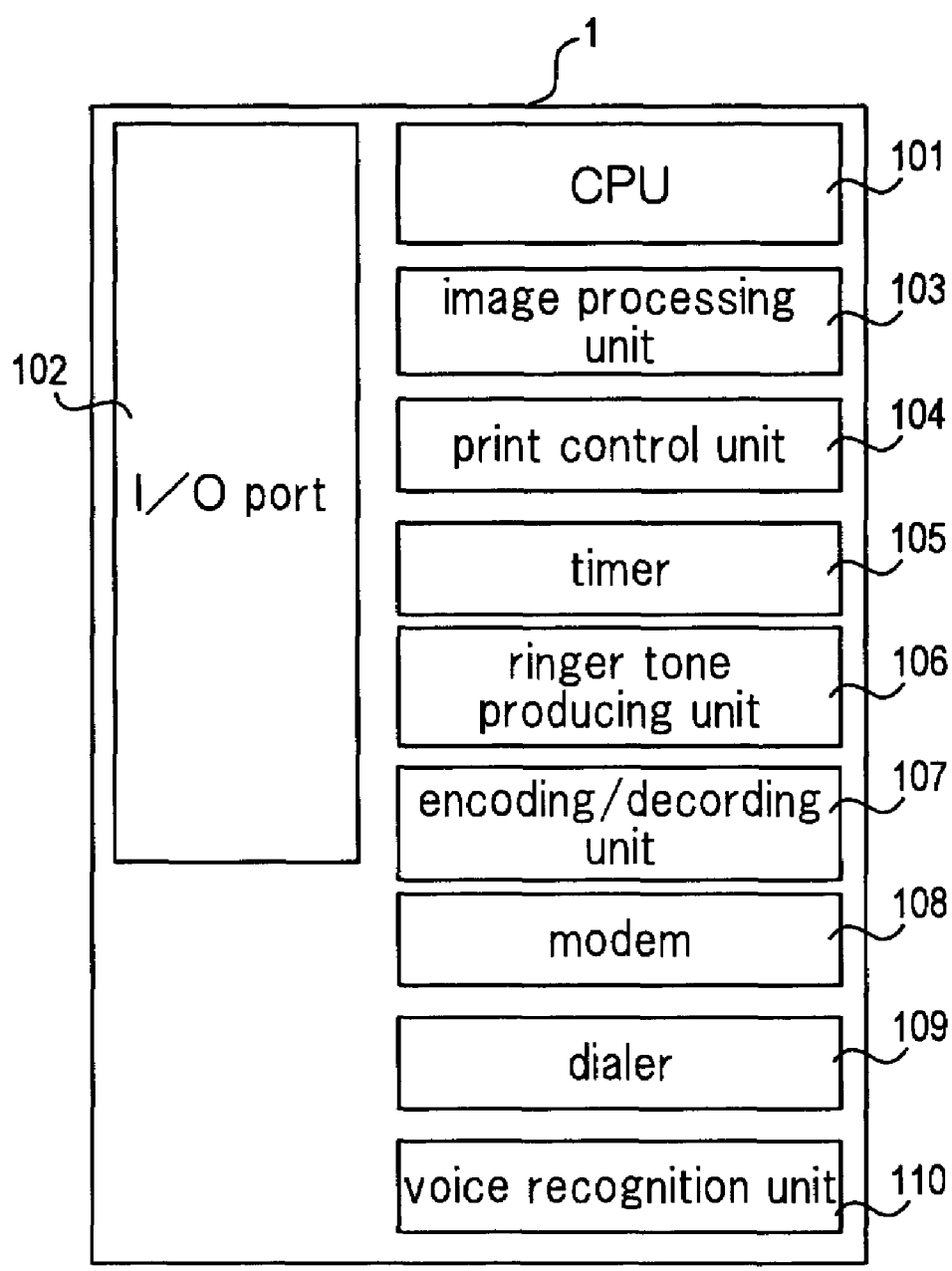
FIG. 2 is a block diagram illustrating a structure of a control device in a facsimile apparatus of FIG. 1.

FIG. 1 is a block diagram illustrating a whole structure of a facsimile apparatus applying the present invention. FIG. 2 is a block diagram illustrating a structure of a Fax function control device of the facsimile apparatus in FIG. 1.

The facsimile apparatus in this embodiment comprises a Fax function control device 1 that includes CPU (Central Processing Unit), working memories such as RAM (Random Access Memory) and registers inside, and controls operations of various facsimile functions. The Fax function control device 1 which is connected with ROM (Read Only Memory) 2 acts on programs such as a control program previously stored in the ROM 2 in order to control operations of each circuit as described later. The Fax function control device 1 is connected with each circuit through buses. As will be described later, the Fax function control device 1 performs various facsimile functions on the basis of programs stored in the ROM 2. Hence, various arithmetic processing to operate facsimile functions such as encoding and decoding and modulating and demodulating of a modem or the like are carried out on the basis of the program read from ROM 2. In order to make it easier to understand the arithmetic processing, the operation of modem caused by arithmetic processing, for example, is referred to as a modem processing section in FIG. 2, but the modem processing section is actually the arithmetic processing carried out with the program, thus such specific circuit dose not exist.

A telephone book memory 3 connected with the Fax function control device 1 is a non-volatile memory such as rewritable EEPROM (Electrically Erasable Programmable Read Only Memory) and stores names of the other party, some telephone numbers and/or fax numbers corresponding to the names in the order of the Japanese 50-character kana syllabary or alphabet.

An operation unit 4 connected with the Fax function control device 1 includes a numeric keypad to dial and to input letters, selection keys (up-key and down-key) to select other party stored in the telephone book memory 3, a first enter-key to make a telephone call, a second enter-key to instruct facsimile transmission, and various function-keys to set two flags or the like used for operation of voice recognition as will be described later. Users input a name of the other party and telephone number and/or facsimile number corresponding to the name using the operation unit 4. The Fax function control device 1 feeds the input date to the telephone book memory 3 and the data is stored in the telephone book memory 3.

A display unit 5 connected with the Fax function control device 1 can be, for example, a liquid crystal display device and displays the telephone number input by the operation unit 4 and the names of the other party and telephone numbers and facsimile numbers corresponding to the names stored in the telephone book memory 3. When telephone number information is sent from a calling party upon receiving an incoming call, the display unit 5 displays a telephone number of the incoming call and, in a case where the telephone number has been stored in the telephone book memory 3, the name of the calling party corresponding to the telephone number.

A print unit 6 connected with the Fax function control device 1 may be a thermal printer, an ink-jet printer, or a laser-beam printer, prints transmitted image date or image data read off by a read unit 7 as described below, and outputs it.

The read unit 7 connected with the Fax function control device 1 includes an optical reader such as a CCD (Charge Couple Device), and reads off image information on a document as well as detects the presence or absence of the document to be read (i.e. a state of the document set on a reading position).

A handset 8 comprises a microphone 81 and a speaker 82, and is connected with a telephone channel 20 through a cross-point IC circuit 11. A hook detection unit 18 detects whether the handset 8 is on-hook or off-hook. Here, the on-hook means a state where the handset 8 is sitting on the telephone apparatus while the off-hook means a state where the handset 8 has been picked up from the apparatus. In this embodiment, the off-hook state is also brought about by pushing a function key for using a hands-free function when making a telephone call with the hands-free function.

The hook detection unit 18 detects whether the handset 8 is in an on-hook state or off-hook state and reports the state of hook to the Fax function control device 1. A relay drive unit 13, which is controlled by the Fax function control device 1 based on an output from the hook detection unit 18, controls a switch 12 to open or close the telephone channel 20.

The cross-point IC circuit 11 switches a signal path among the telephone channel 20, the handset 8 and a DAC circuit 15 under the control of the Fax function control device 1. Examples of switching of the signal path include; voice input from the handset 8 is input to the Fax function control device 1 through the DAC circuit 15; a voice signal from the handset 8 is fed to the telephone channel 20; and a voice signal from the telephone channel 20 is fed to the handset 8.

The DAC circuit 15 converts an analogue voice signal fed from the cross-point IC circuit 11 into a digital voice signal and provides the converted signal to the Fax function control device 1. Also the DAC circuit 15 converts a digital voice signal from the Fax function control device 1 into an analogue voice signal and provides the converted signal to the speaker 82 of the handset 8 or a speaker 16 of the telephone apparatus through the cross-point IC circuit 11. The speaker 16 and a microphone 17 provided with the telephone apparatus are used to originate and receive a call in a hands-free fashion by operating keys of the operation unit 4. Upon transmission and reception of a call in the hands-free fashion, a voice signal input from the telephone channel 20 is input to the Fax function control device 1 via the switch 12, the cross-point IC circuit 11 and the DAC circuit 15. Then the voice signal is amplified by an amplifier in the Fax function control device 1, and is outputted from the speaker 16 via the DAC circuit 15 and the cross-point IC circuit 11. On the other hand, the voice signal input from the microphone 17 is input to the Fax function control device 1 via the cross-point IC circuit 11 and the DAC circuit 15. After adjustment of gain in the Fax function control device 1, the voice signal is outputted to the telephone channel 20 via the DAC circuit 15, the cross-point IC circuit 11 and the switch 12.

A memory unit 9 is a rewritable memory, for example, is a semiconductor memory such as an SRAM (Static Random Access Memory), and comprises an area for storing a first flag (MFG1) and a second flag (MFG2), an area for storing various control data such as NG data indicating the number of times which the voice recognizing unit fails to recognize voice as described later, an area for storing a preprogrammed noise level (threshold), and an area for temporarily storing a current time at a certain point in time. A user can set the first flag and the second flag at will by operating the keys of the operation unit 4.

In this embodiment, the first flag (MFG1) can be set either on or off at user's will, but the second flag (MFG2) can be set either on or off only when the first flag (MFG1) is on. While the first flag (MFG1) is off, the second flag 2 (MFG2) must be always off.

The user can call up whole data or a part of data stored in the telephone book memory 3 to display on the display unit 5 by a voice instruction only when the first flag (MFG1) is on. Also the user can select the data of the telephone book memory 3 shown on the display unit 5 and originate a call through the voice instruction alone only when the second flag (MFG2) is on. To ensure these operations, the Fax function control device 1 controls operations with the flags stored in the memory unit 9, as described later.

A voice recognizing dictionary memory 10 stores, for example, a phonemic standard pattern, wordbook or the like. A voice recognition unit 110 in the Fax function control device 1 compares data stored in the dictionary memory 10 with voice data input from the handset 8 or the microphone 17 and determines if there is a match in order to recognize the input voice.

An incoming call detection unit 14 detects the presence of an incoming signal from the telephone channel 20 and informs the result to the Fax function control device 1.

As described above, the cross-point IC circuit 11 switches the handset 8 to the switch 12 or the DAC circuit 15 to connect together under the control of the Fax function control device 1.

Next description is made on a structure of the Fax function control device 1 by referring to FIG. 2. As described above, the Fax function control device 1 executes various arithmetic processing to perform facsimile functions such as encoding/decoding, modulating/demodulating of a modem or the like on the basis of the program read out from ROM 2.

The Fax function control device 1, as shown in FIG. 2, comprises a CPU 101 for controlling entire apparatus and processing sections for performing each operation under a program provided from the ROM 2 through an I/O port 102. The I/O port 102 comprises a plurality of input terminals and output terminals; thereby connecting said each circuit and the Fax function control device 1.

An image processing unit 103 of the Fax function control unit 1 transmits a clock signal for driving the read unit 7 connected to the Fax function control unit 1, inputs and outputs image information, and converts the image information into binary image information or maltivalued image information. An image signal input from the read unit 7 via the I/O port 102 is provided to an encoding/decoding unit 107 through the image processing unit 103. After coded into a compression signal such as MH, MR, MMR in the encoding/decoding unit 107, the image signal is sent to the telephone channel through transmission processing in the modem 108. While a copy operation is performed, image information input from the read unit 7 via the I/O port 102 is provided through the image processing unit 103 and a print control unit 104 to a print unit 6 where the image information is printed out.

The print control unit 104 sends out a clock signal for driving the print unit 6 and sends out image information to the print unit 6.

A timer 105 measures the length of time required for each control operation as described later, and each measured time is provided to the memory unit 9 that stores the time.

A ringer tone producing unit 106 makes a ringing tone. When the incoming call detection unit 14 detects an incoming signal transmitted from the telephone channel 20, the ringer tone producing unit 106 makes a ringing tone and provides it to the DAC circuit 15. The DAC circuit 15 sends out the ringing tone to the speaker 16 through the cross-point IC circuit 11.

The encoding/decoding unit 107 encodes an image signal, which will be transmitted, into a compressed signal such as MH, MR, MMR and decodes the compressed signal, which was received, into an original image signal.

A modem 108 has functions of detecting a Fax control signal (ex. CNG signal, CFD signal, DIS signal) input from the telephone channel 20 via the switch 12, the cross-point IC circuit 11 and the DAC circuit 15; sending out the Fax control signal to the telephone channel 20 via the DAC circuit 15, the cross-point circuit 11 and the switch 12; modulating and demodulating image information, and detecting a telephone number of the calling party sent from a switchboard (not shown) upon incoming call.

As mentioned above, the cross-point IC circuit 11 can switch and connect the telephone channel 20 either to the modem 108 or handset 8, or neither to the modem 108 nor the handset 8 under the control of the Fax function control device 1. During standby, the cross-point IC circuit 11 connects the handset 8 to the switch 12.

A dialer 109 generates a dial signal upon originating a call and sends the dial signal to the telephone channel 20 via the DAC circuit 15, the cross-point IC circuit 11, and the switch 12.

A voice recognition unit 110 reads out data to recognize voice from the voice recognizing dictionary memory 10, which stores a phonemic standard pattern, wordbook or the like, compares the data to voice data input from the handset 8, matches between them and recognizes the voice input from the handset 8. The voice recognizing dictionary memory 10 in this embodiment stores a phonemic standard pattern for compliance with voice data corresponding to each name of the other party stored in the telephone book memory 3 and voice data for performing various functions through voice recognition (ex. "telephone", "Fax", "up", "down"), and a wordbook. By comparing a voice signal input from the handset 8 and voice signal data previously stored in the voice recognizing dictionary memory 10, the voice recognition unit 110 recognizes what kind of voice signals is input.

FIGS. 3-10 are flow diagrams describing control operations of the Fax function control device 1 in the present embodiment.

Now descriptions are made on the operations of the device in the present embodiment by referring to the flow diagrams as below.

In step S1, the Fax function control device 1 detects the presence of key entry by the operation unit 4. If the Fax function control device 1 detects a signal indicating that keys of the operation unit 4 was pushed down, the process goes to step S2 in FIG. 4. If the signal was not detected, the process goes to step S29.

Figure 4:
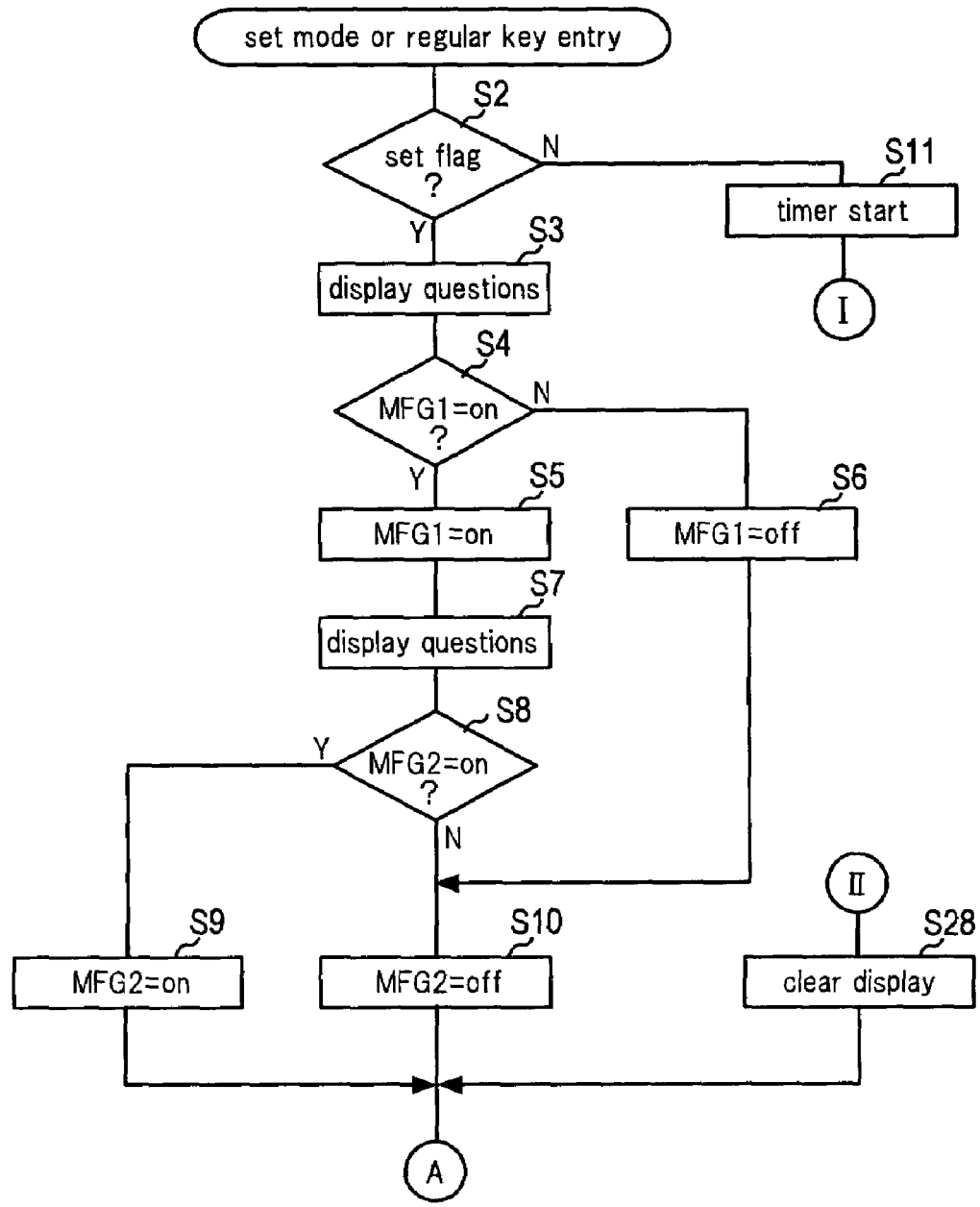
FIG. 4 is a flow diagram illustrating operations of the apparatus in the embodiment.
Figure 5:
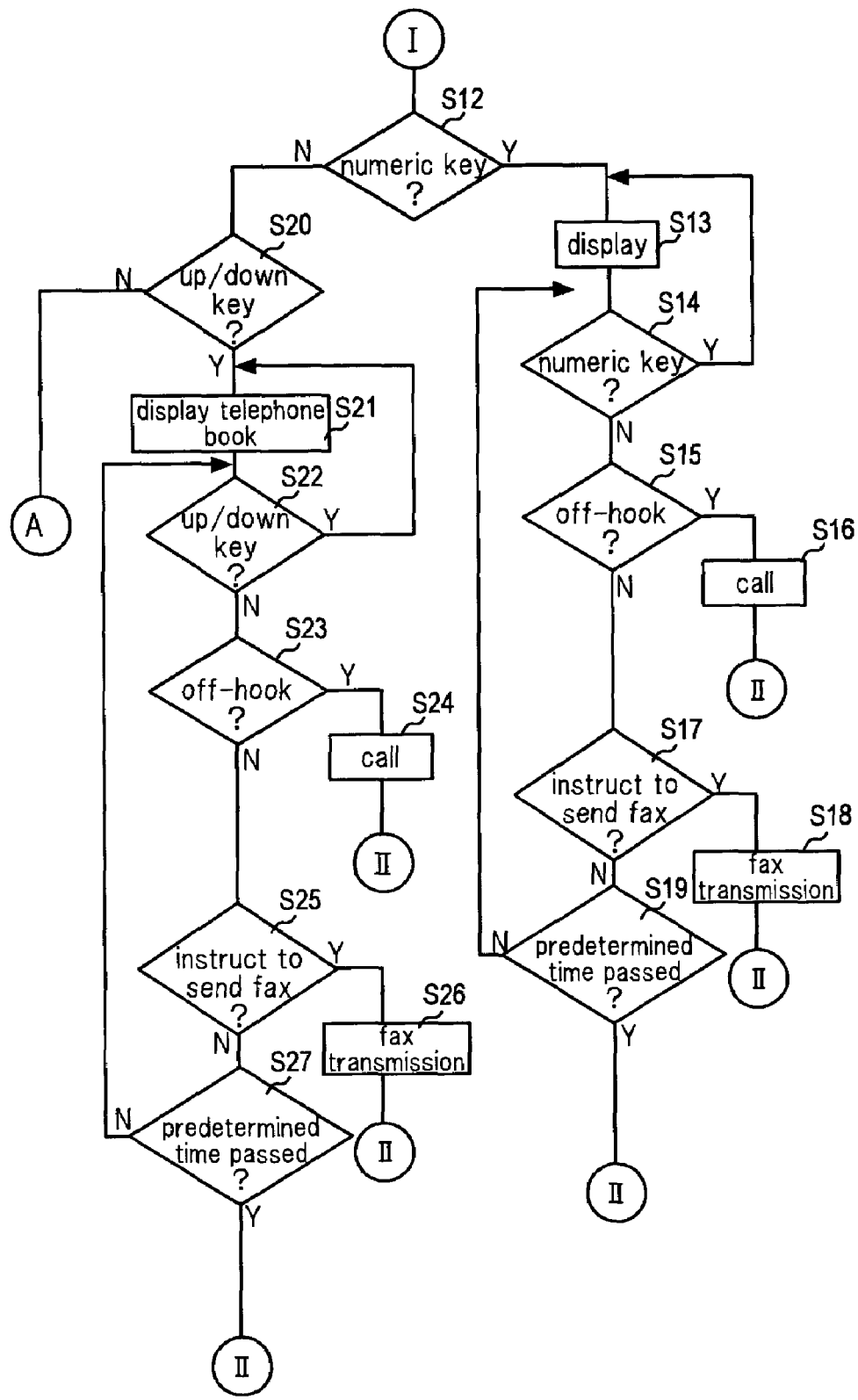
FIG. 5 is a flow diagram illustrating operations of the apparatus in the embodiment.

FIGS. 4 and 5 are flow diagrams showing a mode programming of voice recognition and a process of a normal key entry.

Figure 3:
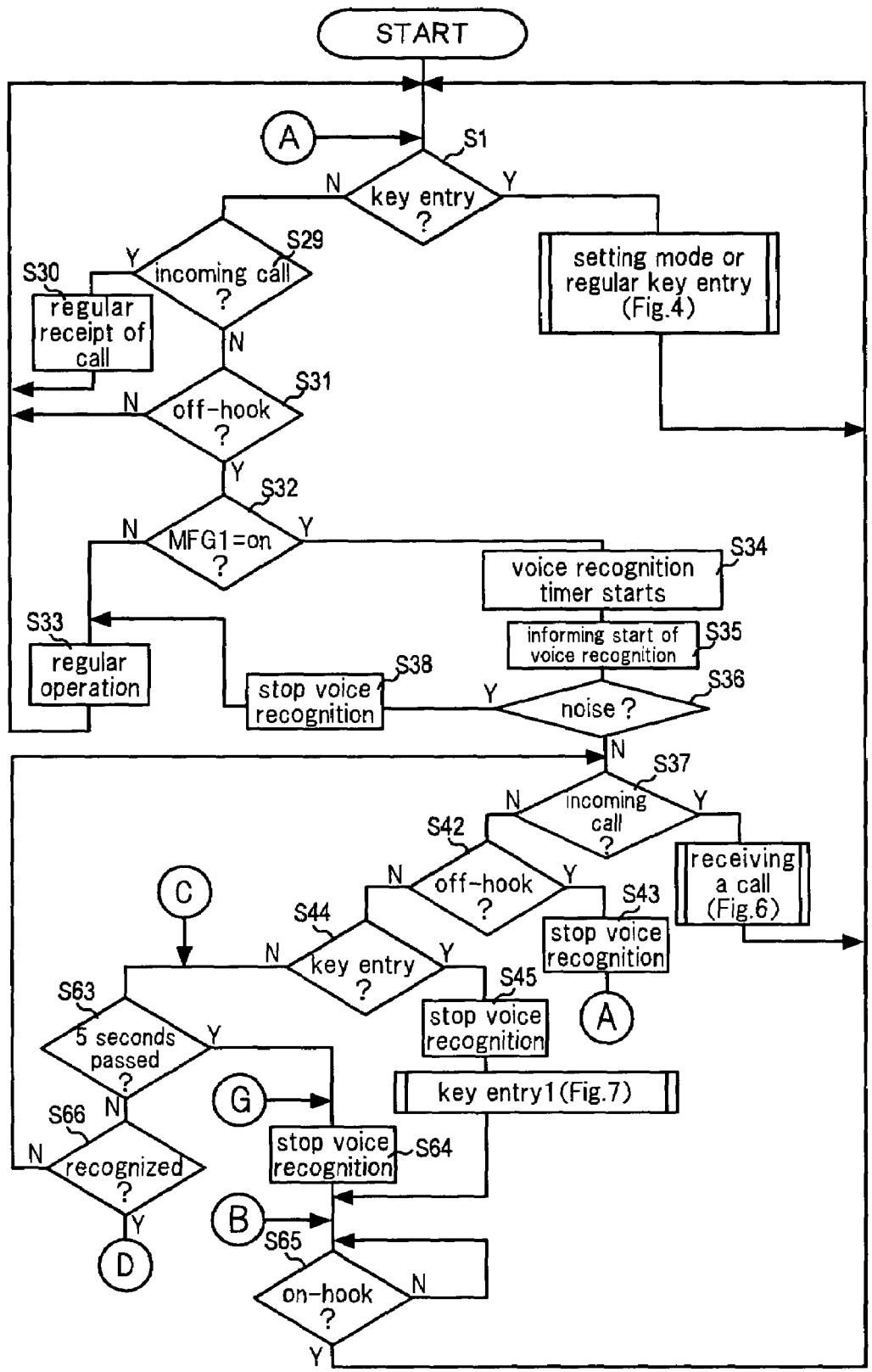
FIG. 3 is a flow diagram illustrating operations of the apparatus in the embodiment applying the present invention.

In step S2 of FIG. 4, the Fax function control device 1 determines the type of the push-down signal fed from the operation unit 4, which was detected in the step S1 (FIG. 3). If it is determined that the push-down signal from the operation unit 4 requires to change the voice recognition mode, the process goes to step S3; otherwise, the process goes to step S11.

In step S3, the Fax function control device 1 displays a questioning message of whether a first flag (MFG1) is turned on or off on the display unit 5. In step S4, it is determined whether a user operates the keys to turn on the first flag (MFG1) in response to the question. If the user operates the keys to turn on the first flag (MFG1), the first flag (MFG1) stored in the memory unit 9 is turned on in step S5 and the process goes to step S7. If the user operates the keys to turn off the first flag (MFG1), the first flag (MFG1) is turned off in step S6 and the process goes to step S10.

In step S7, the Fax function control device 1 displays a questioning message of whether the second flag (MFG2) is turned on or off on the display unit 5 and goes to step S8. In step S8, it is determined whether the user operates the key to turn on the second flag (MFG2) in response to the question. If the user operates the key to turn on the second flag (MFG2), the second flag (MFG2) is turned on in step S9 and the process returns to step S1. If the user operates the key to turn off the second flag (MFG2), the process goes to step S10.

In step S10, the Fax function control device 1 controls the memory unit 9 to turn off the second flag (MFG2) stored in the memory unit 9 and the process returns to step S1 (FIG. 3). Hence, the first flag (MFG1) can be set either on or off at user's will, but the second flag (MFG2) can be set either on or off only when the first flag (MFG1) is on. While the first flag (MFG1) is off, the second flag 2 (MFG2) must be always off.

As will be described later, the user can call up whole data or a part of data stored in the telephone book memory 3 to display on the display unit 5 by a voice instruction only when the first flag (MFG1) is on. Also the user can select the data from the telephone book memory shown on the display unit 5 and originate a call through the voice instruction alone only when the second flag (MFG2) is on.

If it is determined that the flag is not set up in step S2, the process goes to step S11. In step S11, the Fax function control device 1 obtains time data as of this point in time from the timer 105 and temporarily stores the data in the memory unit 9, then goes to step S12 shown in FIG. 5.

In step S12 shown in FIG. 5, the Fax function control device 1 determines whether the key detected in step S1 (FIG. 3) is a numeric key. If it is determined that the key is a numeric key, the process goes to step S13; otherwise, the process goes to step S20.

In step S13, the Fax function control device 1 displays numbers corresponding to the numeric key, which was determined in step S12 or is detected in step S14 as described later, on the display unit 5 in sequence.

In subsequent step S14, the Fax function control device 1 determines the presence of a signal indicating that a numeric key of the operation unit 4 was pushed down. If the signal indicating that a numeric key of the operation unit 4 was pushed down is detected, the process returns to step S13; otherwise, the process goes to step S15.

In step S15, the Fax function control device 1 determines the presence of a signal from the hook detection unit 18. If a signal indicating the off-hook of the handset 8 is detected, the process goes to step S16. If a signal indicating the off-hook of the handset 8 is not detected, the process goes to step S17.

During step S16, the Fax function control device 1 performs call processing. Specifically speaking, the Fax function control device 1 switches the cross-point IC circuit 11 to the handset 8 and the switch 12. The Fax function control device 1 controls the relay drive circuit 13 to close the switch 12 so that a channel between the handset 8 and the telephone channel 20 is formed. Then a number string on the display unit 5 obtained by taking steps S13 and S14 is dialed as a telephone number using the dialer 109 and a telephone conversation starts with a response of a receiving party. If the hook detection unit 18 detects the on-hook of the handset 8 upon finishing the conversation, the process returns to the step S1 in FIG. 3 through the step S28 in FIG. 4.

Further in step S17, the Fax function control device 1 determines whether an instruction for sending fax was provided from the operation unit 4. If it is determined that such instruction was provided, the process goes to step S18; otherwise, the process goes to step S19.

In the step S18, the Fax function control device 1 connects the cross-point IC circuit 11 with the DAC circuit 15 as well as with the switch 12. The Fax function control device 1 controls the relay drive circuit 13 to close the switch 12 so that the modem 108 is connected with the telephone channel 20. A number string on the display unit 5 obtained by taking steps S13 and S14 is dialed as a telephone number using the dialer 109. Then various fax control signals are transmitted and received through the modem 108. After image data obtained by the read unit 7 is sent out to the telephone channel 20 via the modem 108, the process goes to step S28 (FIG. 4) upon finishing the communication.

In the step S28 (FIG. 4), the Fax function control device 1 controls the display unit 5 so as to restore the display of the display unit 5 to a standby condition and the process returns to the step S1 (FIG. 3).

If the instruction for sending fax is not provided in step S17, the process goes to step S19. In the step S19, the Fax function control device 1 determines whether a predetermined period of time has elapsed since the commencement of timing in step S11 (FIG. 4). Specifically speaking, the Fax function control device 1 reads the current time from the timer 105 and judges whether a predetermined period of time has elapsed in consideration of the difference between the read time and the time read out and stored in step S11. If the fax function control device 1 determines a predetermined period of time has elapsed, the process goes to step S28 (FIG. 4); otherwise, the process returns to step S14.

In steps from S12 to S19 as described above, whenever the numeric key is pushed down, a number corresponding to the numeric key is added to carry one digit and is displayed on the display unit 5 as a telephone number. If the handset 8 becomes off hook while the desired telephone number is displayed on the display unit 5, the telephone number on the display unit 5 is dialed through the use of the dialer 109 to make a call. If the number on the display unit 5 is a facsimile number and an operation is made to instruct for making a facsimile transmission, the facsimile number on the display unit 5 is dialed through the dialer 109 to make a facsimile transmission. After the completion of the facsimile transmission, the process goes to step S28 (FIG. 4).

In the step S28 (FIG. 4), the Fax function control device 1 controls the display unit 5 so as to restore the display of the display unit 5 to a standby condition and the process returns to the step S1 (FIG. 3).

If the Fax function control device 1 determines that the key entry from the operation unit 4 in the step S1 (FIG. 3) is made by a numeric key of the operation unit 4, the process goes from step S12 to step S20. The Fax function control device 1 judges whether the key is an up/down key in step S20. If it is determined that the key is up/down key, the process goes to step S21; otherwise, the process returns to step S1.

In the step S21, the Fax function control device 1 causes the display unit 5 to switch and display the telephone number data stored in the telephone book memory 3 through the operation of the up/down key, which was judged in the step 20 or detected in step S22 as will be described later.

If, in the subsequent step S22, the Fax function control device 1 detects a signal representing the up/down key of the operation unit 4 was operated, the process returns to the step S21; otherwise, the process goes to step S23.

In step S23, the Fax function control device 1 judges the presence of a signal from the hook detection unit 18. If a signal representing the off-hook of the handset 8 is detected, the process goes to step S24. If, the off-hook of the handset 8 is not detected, the process goes to step S25.

During step S24, the Fax function control device 1 performs call processing. Specifically speaking, the Fax function control device 1 switches the cross-point IC circuit 11 to the handset 8 and the switch 12. The Fax function control device 1 controls the relay drive circuit 13 to close the switch 12 so that a channel between the handset 8 and the telephone channel 20 is formed. Then, a telephone number, which was selected by the up/down key in the steps S20 and S22 and displayed on the display unit 5, is transmitted by means of the dialer 109. A telephone conversation starts when the receiving party answers. If the hook detection unit 18 detects the on-hook of the handset 8 upon finishing the conversation, the process goes to the step S28 (FIG. 4).

In the step S28 (FIG. 4), the Fax function control device 1 controls the display unit 5 so as to restore the display of the display unit 5 to a standby condition and the process returns to the step S1 (FIG. 3).

In step S25, the Fax function control device 1 determines whether a facsimile transmission was instructed through the operation unit 4. If it is determined such instruction was made, the process goes to step S26; otherwise, the process goes to step S27.

In the step S26, the Fax function control device 1 connects the cross-point IC circuit 11 with the DAC circuit 15 as well as with the switch 12. The Fax function control device 1 controls the relay drive circuit 13 to close the switch 12 so that the modem 108 is connected with the telephone channel 20. A number string on the display unit 5 obtained by taking steps S20 and S22 is dialed as a telephone number using the dialer 109. Then various fax control signals are transmitted and received through the modem 108. After image data obtained by the read unit 7 is sent out to the telephone channel 20 via the modem 108, the process goes to step S28 (FIG. 4) upon finishing the communication.

In the step S28 (FIG. 4), the Fax function control device 1 controls the display unit 5 so as to restore the display of the display unit 5 to a standby condition and the process returns to the step S1 (FIG. 3).

If the instruction for sending fax is not provided in step S25, the process goes to step S27. In the step S27, the Fax function control device 1 determines whether a predetermined period of time has elapsed since the commencement of timing in the step S11 (FIG. 4). If the Fax function control device 1 judges that a predetermined period of time has elapsed in consideration of the difference between the read time and the time read out and stored in the step S11, the process goes to step S28 (FIG. 4); otherwise, the process returns to step S22.

Thus, a mode programming of voice recognition and an entry of telephone number for conventional telephone conversation and facsimile communication can be executed with key operation.

Next description is made to explain a process in the case where the Fax function control device 1 does not detect a signal representing that keys are pushed down in step 1.

In step 29 shown in FIG. 3, the Fax function control device 1 judges the presence of an incoming call on a basis of a signal from an incoming call detection unit 14. If a signal indicating the presence of an incoming call from the incoming call detection unit 14 is detected, the process goes to step S30; otherwise, the process goes to step S31.

The Fax function control device 1 executes regular process to receive the incoming call and the process returns to step S1. Specifically, the Fax function control device 1 controls the ringer tone producing unit 106 to make ringing tone from the speaker 16. In a case where the incoming call is received in the hand-operating fashion, the Fax function control device 1 switches the cross point IC circuit 11 to the handset 8 and the switch 12 when detecting a signal representing the off-hook of the handset 8 from the hook detection unit 18. The Fax function control device 1 controls the relay drive circuit 13 to close the switch 12 so that a channel between the handset 8 and the telephone channel 20 is formed, which enables telephone conversation. In a case where the incoming call is received in the automatic fashion, the Fax function control device 1 switches the cross point IC circuit 11 to the telephone channel 20 and the DAC circuit 15. Also the Fax function control device 1 controls the relay drive circuit 13 to close the switch 12 so that the modem 108 transmits and receives various facsimile control signals. If it is determined that the calling party originated a call through a Fax terminal, facsimile communication is performed. The Fax function control device 1 connects the cross point IC circuit 11 to the handset 8 when recognizing that the telephone conversation or facsimile communication is over (on-hook detection).

In a case where the call is made in hands-free fashion, the Fax function control device 1 switches the cross point IC circuit 11 to the speaker 16, microphone 17 and switch 12. Also the Fax function control device 1 controls the relay drive circuit 13 to close the switch 12 so that a channel among the speaker 16, microphone 17 and telephone channel 20 is formed, thereby allowing telephone conversation.

In step 31, the Fax function control device 1 monitors the hook detection unit 18. If a signal, which is sent from the hook detection unit 18 and represents the off-hook of the handset 8, is detected, the process goes to step S32; otherwise, the process returns to step S1.

For information, a loop composed of the step S1, S29 and S31 is the so-called standby state.

In step S32, the Fax function control device 1 checks a condition of a first flag (MFG1) stored in the memory unit 9. If the Fax function control device 1 judges that the first flag (MFG1) is on, the process goes to step S34. On the other hand, if it is judged that the first flag (MFG1) is off, the process goes to step S33.

In the step S33, the Fax function control device 1 executes regular operations; specifically, controlling the cross point IC circuit 11 so that a channel between the handset 8 and the telephone channel 20 is formed; causing the display unit to append and display numbers corresponding to the numeric keys on the display unit 5 every time key entry is made through the numeric keys of the operation unit 4; sending the dial signal corresponding to the displayed numbers on the display unit 5 from the dialer 109 to the telephone channel 20. The telephone conversation starts with the reception of the signal by the receipt party. When the telephone conversation finishes with the on-hook of the handset 8, the Fax function control device 1 resets the process to step S1.

In step S34, the Fax function control device 1 obtains current time data from the timer 105 and stores the data in the given region of the memory unit 9. The Fax function control device 1 controls the cross point IC circuit 11 so that an analog voice signal from the handset 8 is converted into a digital voice signal in the DAC circuit 15, thereby making the signal possible to be outputted. Also the Fax function control device 1 allows the voice recognition unit 110 to start recognizing the digital voice signal.

The process of storing current time in step S34, as will be apparent from the description afterward, is performed for the following reason; the Fax function control device 1 considers that the user has no intention of providing a voice instruction and stops the voice recognition if the Fax function control device 1 failed to detect a signal indicating that the voice is properly recognized from the voice recognition unit 110 within predetermined period of time (five seconds) after the Fax function control device 1 detected a signal indicating the off-hook of the handset 8 from the hook detection unit 18. This prevents the voice recognition unit 110 from performing needless operations for recognizing voice even when voice is not input from the handset 8 for indefinitely long period of time.

In subsequent step S35, the Fax function control device 1 informs the user of the commencement of voice recognition. Specifically, the Fax function control device 1 allows the speaker 16 to beep or the display unit 5 to display "input voice".

In subsequent step S36, the Fax function control device 1 compares a voice level, which is input from the handset 8 and converted into a digital signal in the DAC circuit 15, and a noise level, which is previously stored in the memory unit 9, in a short time (ex. 250 μs) after the completion of the process in the step S34. If it is determined that the voice level input from the handset 8 is higher than the noise level previously stored in the memory unit 9, the process goes to step S38. On the other hand, the process goes to step S37 when the voice level input from the handset is lower.

In a case where a high-noise environment extremely drops the rate of voice recognition, the process in step S36 prevents users from confusing the reduction in voice recognition rate with a failure by suppressing the voice recognition process.

Figure 6:
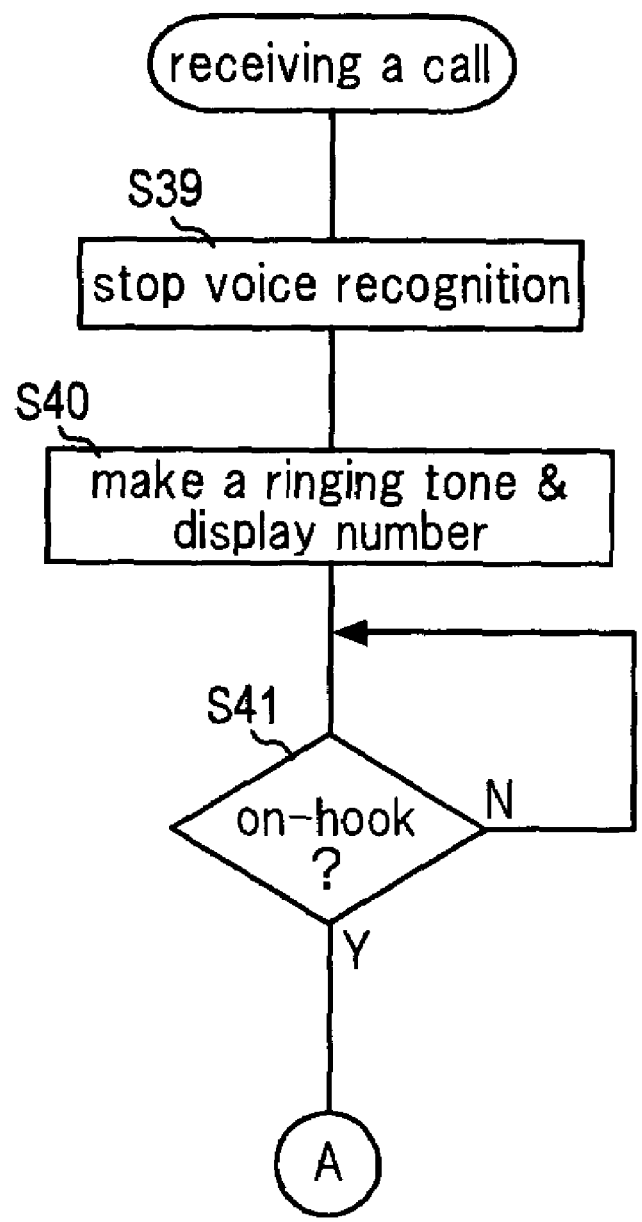
FIG. 6 is a flow diagram illustrating operations of the apparatus in the embodiment.

If the Fax function control device 1, in step S37, detects a signal representing the presence of an incoming call from the incoming signal detection unit 14, the process goes to step S39 shown in FIG. 6; otherwise, the process goes to step S42.

In step S38, the Fax function control device 1 stops the voice recognizing process.

Specifically speaking, the voice recognition unit 110 stops operations for recognizing voice and the cross point IC circuit 11 switch over so as not to provide the voice signal input from the handset 8 to the DAC circuit 15 under the control of the Fax function control device 1. After that, the Fax function control device 1 returns the process to step S33.

In step S39 shown in FIG. 6, the Fax function control device 1 stops the voice recognizing process in a manner similar to step S38 and the process goes to step S40.

In step S40, the Fax function control device 1 controls the ringer tone producing unit 106 to allow the speaker 16 to beep. Also the Fax function control device 1 switches the cross point IC circuit 11 to connect with the switch 12 and the DAC circuit 15. After the modem 108 detects telephone number data of a calling party sent from the telephone channel 20, the Fax function control device 1 allows the display unit 5 to display the telephone number, then the process goes to step S41.

If the Fax function control device 1 detects a signal representing the on-hook of the handset 8 from the hook detection unit 18 in step S41, the process returns to step S1. Coinciding with the detection of the signal representing the on-hook of the handset, the cross point IC circuit 11 is switched to the handset 8.

Even though a call arrives from the telephone channel during voice recognition, as described above, the voice recognition is stopped and a user can answer the call. The reason why this apparatus is structured in this manner is to provide an excellent usability to users by giving a higher priority to a reception of an incoming call than the voice recognition because user can originate a call whenever he/she wants, but can receive a call only when the call comes.

In step S42, reverting to FIG. 3, if the fax function control device 1 detects a signal indicating the on-hook of the handset 8 from the hook detection unit 18, the process goes to step S43; otherwise, the process goes to step S44.

In the step S43, the Fax function control device 1 stops the voice recognition in a same way as the step S38, and the process returns to step S1.

If the fax function control device 1 detects a signal indicating that the user operated keys of the operation unit 4 in step S44, the process goes to step S45; otherwise, the process goes to step S63.

Figure 7:
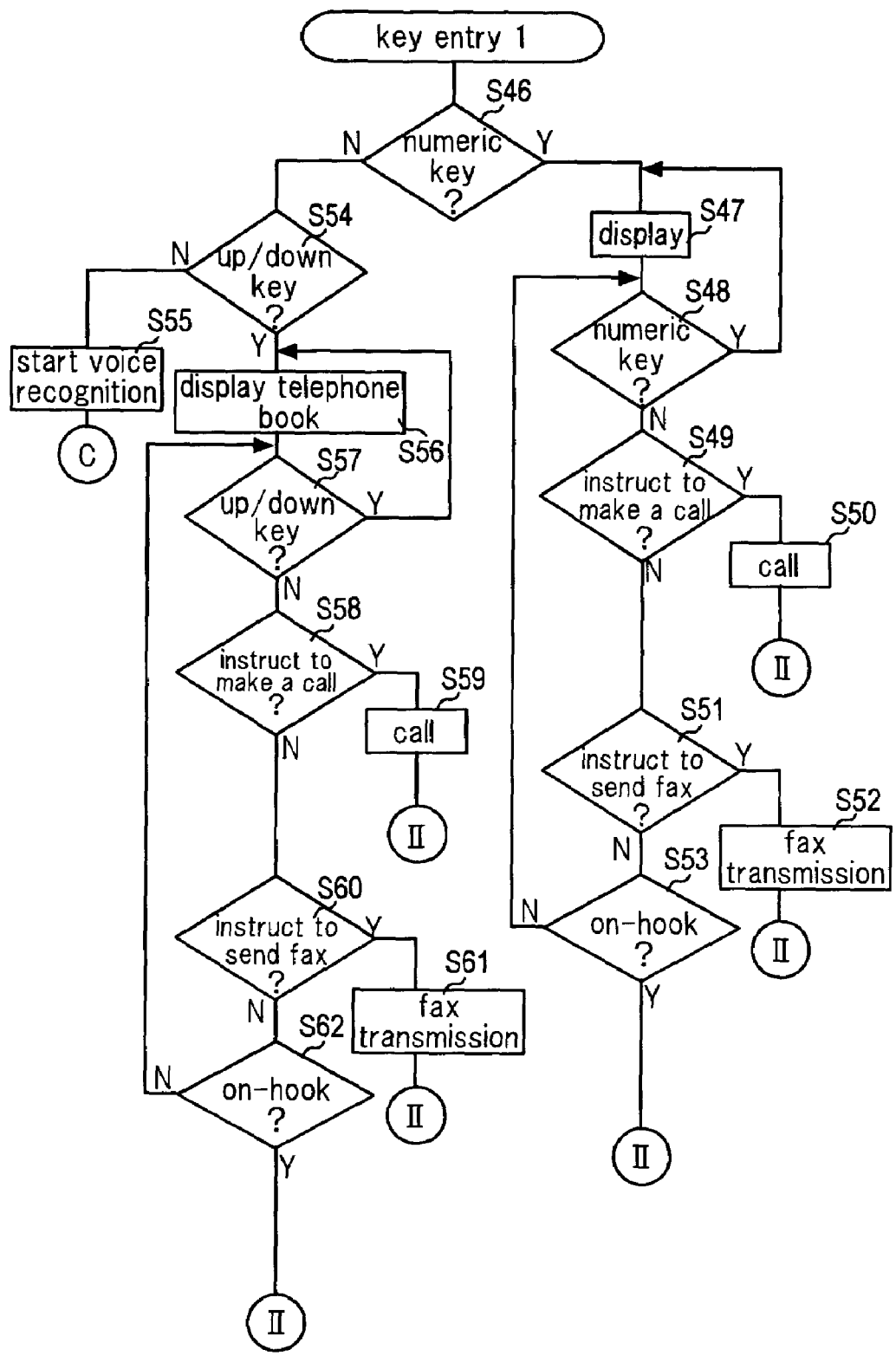
FIG. 7 is a flow diagram illustrating operations of the apparatus in the embodiment.

In the step S45, the Fax function control device 1 stops the voice recognition in a same way as the step S43, and the process goes to step S46 shown in FIG. 7.

If the Fax function control device 1, in the step S46 shown in FIG. 7, determines that the keys detected in the step S44 (FIG. 3) are numeric keys, the process goes to step S47; otherwise, the process goes to step S54.

Explanations of steps S47-S52 are omitted to avoid duplication except for one difference in step S47 because those steps are same as steps S13 to S18 in FIG. 5. Following is the difference. In step S15 shown in FIG. 5, when the Fax function control device 1 detects a signal indicating the off-hook of the handset 8 from the hook detection unit 18, the process goes to step S16. On the other hand, the process goes to step S50 in which the call processing is performed when the Fax function control device 1 detects that an instruction of making a call was operated by means of the operation unit 4 (e.g. a first enter key was pushed down) in step S49 shown in FIG. 7.

If the Fax function control device 1, in step S51, detects that an instruction of transmitting facsimile was operated by means of the operation unit 4 (e.g. a second enter key was pushed down), the process goes to step S52. After executing facsimile transmission in step S52, the process goes to step S28 shown in FIG. 4.

If the Fax function control device 1, in step S53, detects a signal indicating the on-hook of the handset 8 from the hook detection unit 18, the process goes to step S28 in FIG. 4; otherwise, the process returns to step S48.

If the Fax function control device 1, in step S54, determines that the key entry detected in step S44 (FIG. 3) was operated with up/down key, the process goes to step S56; otherwise, the process goes to step S55.

In the step S55, the Fax function control device 1 resumes the voice recognition and the process goes to step S63 (FIG. 3). Specifically, the Fax function control device 1 controls the cross point IC circuit 11 to send an analog voice signal from the handset 8 to the DAC circuit 15. The analog voice signal is converted into a digital voice signal in the DAC circuit 15, thereby making the signal possible to be outputted. At the same time, the Fax function control device 1 allows the voice recognition unit 110 to start recognizing the digital voice signal.

If the Fax function control device 1, in step S56, switches and displays telephone number data, which are stored in the telephone book memory 3, on the display unit 5 in synchronization with operations of the up/down key which was determined in above-mentioned step S54 or detected in step S57 described later.

If the Fax function control device 1, in subsequent step S57, detects a signal indicating that the up/down key of the operation unit 4 was operated, the process returns to step S56; otherwise, the process goes to step S58.

If the Fax function control device 1, in the step S58, detects a signal indicating that the operation unit 4 instructed to originate a call (e.g. the first enter key is pushed down), the process goes to step S59; otherwise, the process goes to step S60.

In step S59, the Fax function control device 1 performs call processing. Specifically speaking, the Fax function control device 1 controls the cross-point IC circuit 11 so that a channel is formed between the handset 8 and the telephone channel 20. Then, a telephone number, which was selected by the up/down key in the steps S54 or S57 and displayed on the display unit 5, is transmitted by means of the dialer 109. A telephone conversation starts when the receiving party answers. When the hook detection unit 18 detects the on-hook of the handset 8 upon finishing the conversation, the process returns to the step S28 shown in FIG. 4.

In step S60, the Fax function control device 1 determines whether the operation unit 4 instructed to send a fax (the second enter key was pushed down). If it is determined that such instruction was done, the process goes to step S61; otherwise, the process goes to step S62.

In step S61, the Fax function control device 1 controls the cross point IC circuit 11 to connect the modem 108 and the telephone channel 20. Then the telephone number, which was selected with the operation of the up/down key in the step S54 or S57 and displayed on the display unit 5, is transmitted by means of the dialer 109, thereby transmitting and receiving various facsimile control signals through the modem 108. After an image date read out in the read unit 7 is transmitted toward the telephone channel 20, the communication is stopped and the process goes to step S28 (FIG. 4).

In the same way as step S53, if the Fax function control device 1 detects a signal indicating that the off-hook of the handset in step S62, the process goes to step S28 shown in FIG. 4; otherwise, the process returns to step S57.

In step S63, reverting to FIG. 3, if the fax function control device 1 determines whether a predetermined period of time has elapsed (ex. five seconds) in the same manner as step S19, the process goes to step S64; otherwise, the process goes to step S66.

In the step S64, the Fax function control device 1 stops recognizing voice in the same manner as the step S38, and the process goes to step S65.

In step S65, the Fax function control device 1 waits until detecting a signal indicating the off-hook of the handset 8 from the hook detection unit 18. After the signal indicating the on-hook is detected, the process returns to step S1.

Figure 8:
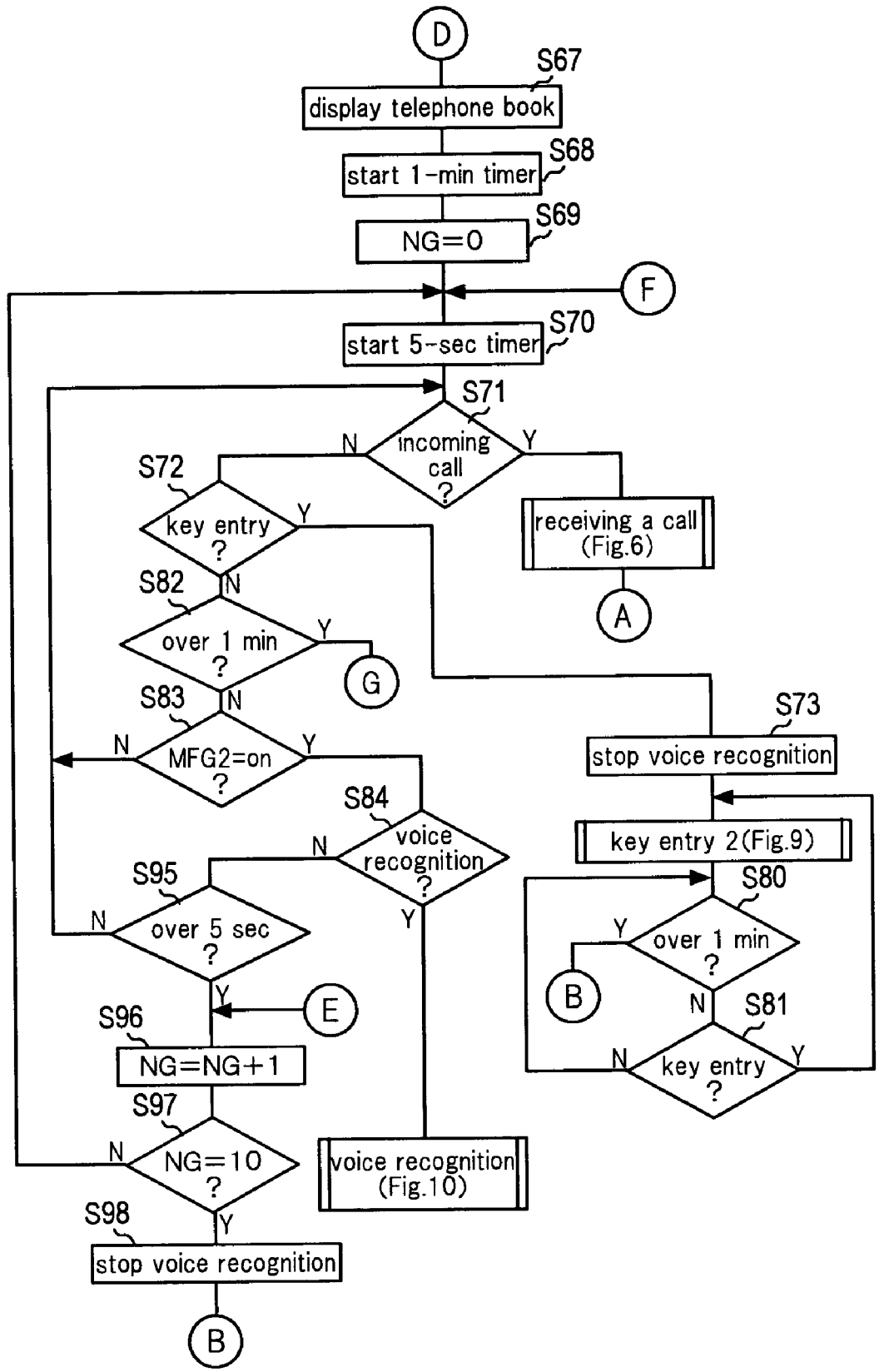
FIG. 8 is a flow diagram illustrating operations of the apparatus in the embodiment.

If the Fax function control device 1, in step S66, detects that a signal indicating that the voice ("telephone book" or individual name) input from the handset 8 was outputted from the voice recognition unit 110, the process goes to step S67 shown in FIG. 8; otherwise, the process returns to step S37.

After the voice recognition unit 110 recognizes a voice signal ("telephone book" or "individual name") instructing to display the telephone book from the handset 8 within a predetermined period of time (ex. five seconds) from the commencement of voice recognition, a telephone number stored in the telephone book memory 3 is searched through voice or keys and an a call processing is performed in following processes from step S67 (FIG. 8).

In a case where the voice recognized in the above step S63 refers to "telephone book", in step S67 of FIG. 8, the Fax function control device 1 retrieves a name of other party which is stored in first address of the telephone book memory 3 and telephone number and/or facsimile number corresponds to the name. The name and numbers are displayed on the display unit 5.

Figure 11:
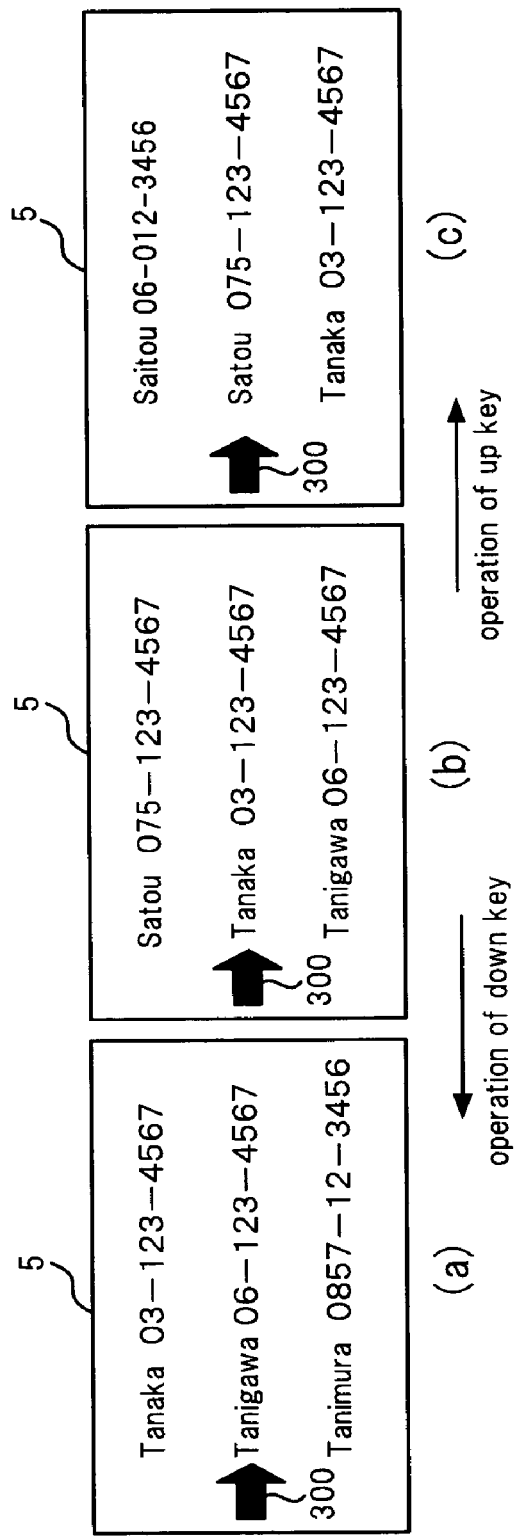
FIG. 11 is a view showing a display form of a display unit of the apparatus in the embodiment.

If the recognized voice refers to an individual name (ex. Tanaka), as shown in FIG. 11(b), the Fax function control device 1 retrieve the name of the other party, which is stored in the telephone book memory 3 and corresponds to the individual name, and telephone number and/or facsimile number corresponding to the name (Tanaka). The name and numbers are displayed on the display unit 5.

At this moment, the display unit 5 displays an individual name (ex. Sato) stored in an address above the recognized individual name (ex. Tanaka) and an individual name (ex. Tanigawa) stored in an address below the recognized individual name (ex. Tanaka) in the telephone book memory 3. Also the display unit 5 displays a pointer 300 pointing an area displaying the recognized name.

In a case where the recognized voice refers to an individual name, for example, three individual names, which are most similar to the result of recognizing voice, can be displayed on the display unit 5 as potential names.

In subsequent step S68, the Fax function control device 1 retrieves data indicating current time at the point in time from the timer 105 and stores the data temporarily in the memory unit 9. The process goes to step S69.

The Fax function control device 1 temporarily stores the time data in the memory unit 9 in order to determine if a predetermined period of time (ex. one minute) has elapsed in step S80 as described later. Owing to this, the voice recognition and key can be operated only for one minute after the display unit 5 displays contents in the telephone book memory 3. Such structure can avoid malfunctions caused by unwanted input of voice and key operation because the device considers itself to be left alone if no key has been operated or no voice has been input from the handset 8 for quite long time since the contents of the telephone book memory 3 were displayed on the display unit 5.

In step S69, the Fax function control device 1 controls the memory unit 9 to clear NG data stored in the memory unit 9, then the process goes to step S70.

In the step S70, the Fax function control device 1 retrieves data indicating current time at the point in time from the timer 105 and stores the data in the memory unit 9 temporarily and separately from the data retrieved in step S68. The process goes to step S71.

The Fax function control device 1 temporarily stores the time data in the memory unit 9 in the step S70 in order to consider that the voice recognition was failed if voice was not input within a predetermined period of time (ex. five seconds). Thus, the recognizing operation can be stopped with a predetermined time of failure of the voice recognition even if one minute has not elapsed yet.

If the Fax function control device 1 receives a signal indicating an incoming call from the incoming signal detection unit 14 in step S71, the process goes to step S39 shown in FIG. 6 to execute a process for receiving the call. If not receiving the signal, the process goes to step S72.

In the step S72, if the Fax function control device 1 determines whether a key of the operation unit 4 is pushed down and detects a signal indicating that the key was pushed down from the operation unit 4, the process goes to step S73; otherwise, the process goes to step S82.

Figure 9:
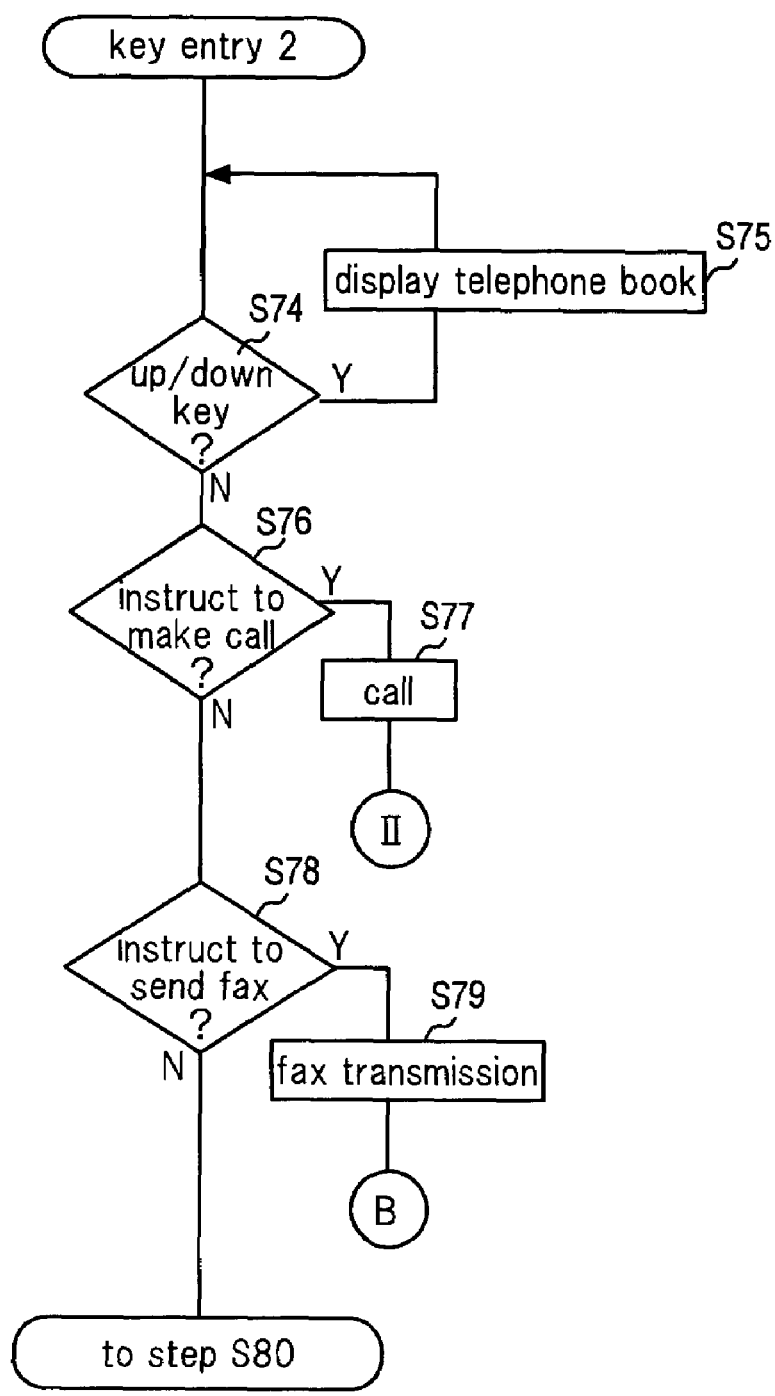
FIG. 9 is a flow diagram illustrating operations of the apparatus in the embodiment.

In the step S73, the Fax function control device 1 stops recognizing voice in the same manner as the step S38 (FIG. 3), and the process goes to step S74 shown in FIG. 9.

In the step S74 shown in FIG. 9, if the Fax function control device 1 determines that the operated key, which was detected in the described step S72 (FIG. 8) or step S81 (FIG. 8) as will be described later, is an up/down key, the process goes to step S75; otherwise, the process goes to step S76.

In step S75, the Fax function control device 1 switches and displays names of the other party and telephone numbers and facsimile numbers corresponding to the names on the display unit 5 with the operation of the up/down key (up/down scroll display). When an up key is pressed while the pointer 300 is pointing Tanaka as shown in FIG. 11(b), for example, the data (ex. of Sato) stored at an address just before an address storing data of Tanaka in the telephone book memory 3 is switched to a position at which the pointer 300 is pointing as shown in FIG. 11(c). On the other hand, when a down key is pressed, the data (ex. for Tanigawa) stored at an address just after the address storing data of Tanaka in the telephone book memory 3 is switched to a position at which the pointer 300 is pointing as shown in FIG. 11(a).

If the Fax function control device 1, in the step S76, determines that the key operation (i.e. a press of the first enter key), which was detected in the above-mentioned step S72 (FIG. 8) or step S81 (FIG. 8) described later, instructs to originate a call, the process goes to step S77; otherwise, the process goes to step S78.

In the step S77, the Fax function control device 1 performs a call processing. Specifically, the Fax function control device 1 controls the cross-point IC circuit 11 to switch and connect the handset 8 to the switch 12. The Fax function control device 1 controls the relay driving circuit 13 to closes the switch 12 so that a channel is formed between the handset 8 and the telephone channel 20. Then, a telephone number, which was selected by the up/down key in the steps S72 and pointed by the pointer 300 on the display unit 5, is transmitted by means of the dialer 109. The Fax function control device 1 controls the cross point IC circuit 11 to transmit the telephone number from the DAC circuit 15 to the telephone channel 20 via switch 12. A telephone conversation starts when the receiving party answers. After that, the process returns to step S1 through step S28 shown in FIG. 4, if the hook detection unit 18 detects the off-hook of the handset 8.

If the Fax function control device 1, in the step S78, determines that the key operation (i.e. a press of the second enter key), which was detected in the above-mentioned step S72 (FIG. 8) or step S81 (FIG. 8) described later, instructs to send a fax, the process goes to step S79; otherwise, the process goes to step S80 shown in FIG. 8.

In the step S79, the Fax function control device 1 performs a fax transmission in a same manner as step S61 of FIG. 7. After the completion of the fax transmission, the process goes to step S65 shown in FIG. 3.

In step S80 shown in FIG. 8, the Fax function control device 1 reads current time from the timer 105. If the Fax function control device 1 determines that one minute has passed in consideration of a time difference between the time stored in step S68 and the current time, the process goes to step S65 (FIG. 3); otherwise, the process returns to step S81.

In the step S81, the Fax function control device 1 judges whether a key of the operation unit 4 was pressed. If a signal indicating the press of the key from the operation unit 4, the process returns to step S74 shown in FIG. 9; otherwise, the process returns to step S80.

Thus, if the Fax function control device 1 detects the signal indicating that a key was pressed even on the condition that the telephone numbers stored in the telephone book memory 3 can be switched over and displayed by means of the voice recognition, the Fax function control device 1 is capable of terminating the operation of the voice recognition, selecting data from telephone book and originating a call by pressing the keys.

In step S82 of FIG. 8, the Fax function control device 1 reads a current time from the timer 105. If the device 1 determines that one minute has passed in consideration of a time difference between time stored in step S68 and the current time, the process goes to step S64 (FIG. 3); otherwise, the process goes to step S83.

In the step S83, the Fax function control device 1 reads data of a second flag (MFG2) stored in the memory unit 9. If it is judged that the second flag (MFG2) is on, the process goes to step S84. If it is judged that the second flag (MFG2) is off, the process returns to step S71.

In step S84, the Fax function control device 1 determines whether the voice recognition unit 110 recognized voice. If a signal indicating that the voice recognition unit 110 recognized voice is detected, the process goes to step S85 in FIG. 10; otherwise, the process goes to step S95.

Figure 10:
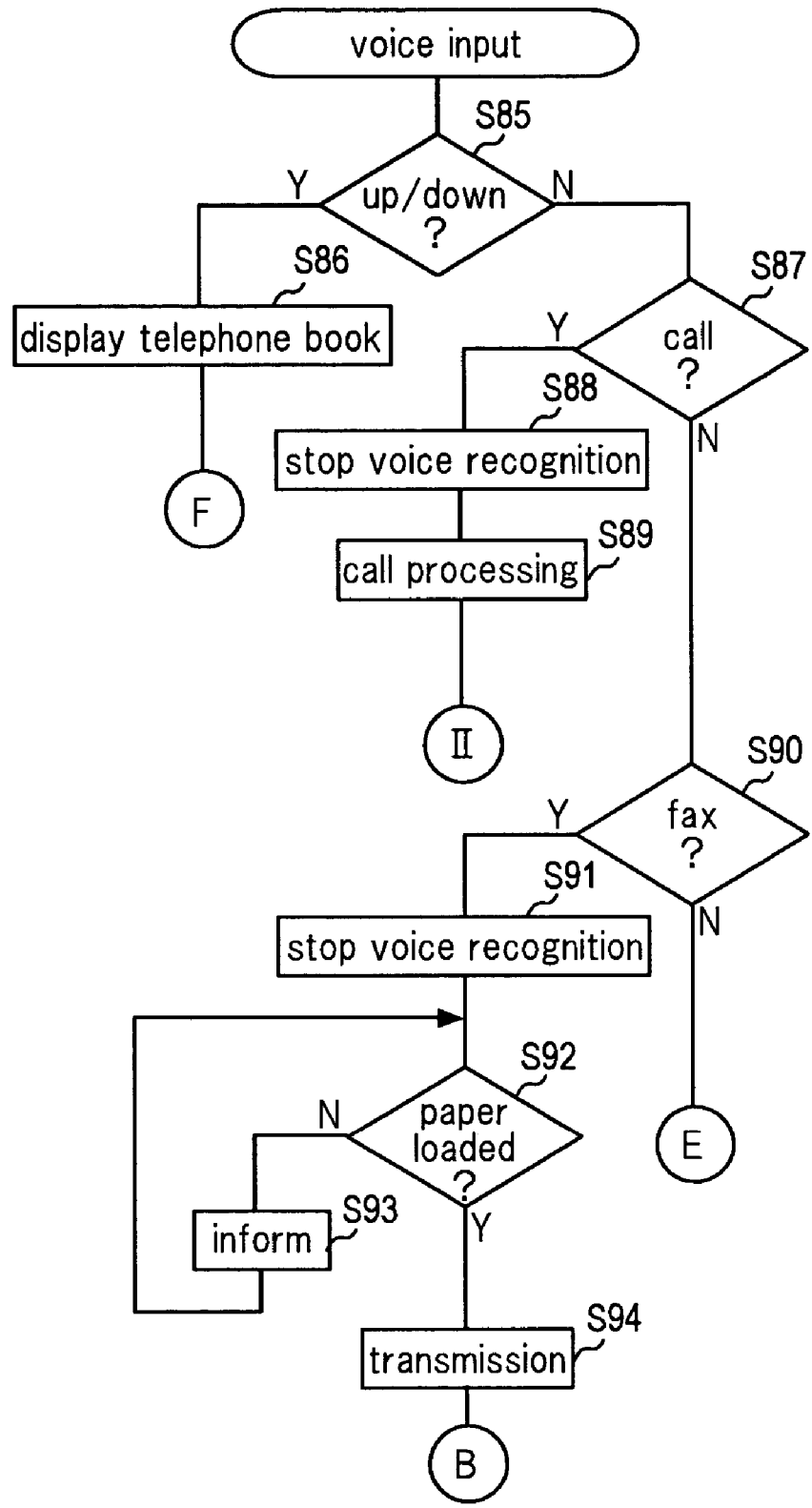
FIG. 10 is a flow diagram illustrating operations of the apparatus in the embodiment.

Steps S85 to S94 in FIG. 10 are processes of searching telephone number and originating a call with voice. If the Fax function control device 1 determines the result obtained by the voice recognition unit 110 in the above-mentioned step S84 is recognized as a voice sounding "up" or "down" in step S85, the process goes to step S86; otherwise, the process goes to step S87.

In step S86, the Fax function control device 1 reads a name of the other party and the telephone number and fax number corresponding to the name out of the telephone book memory 3 in response to the voice "up" or "down" recognized by the voice recognition unit 110, and displays them on the display unit 5 as switching. After that, the process goes to step S70 shown in FIG. 8.

In steps S85 and S86, when a user provides an voice instruction, saying "up", while the pointer 300 is pointing Tanaka on the display unit 5 as shown in FIG. 11(b), for example, the data (ex. of Sato) stored at an address just before an address storing data of Tanaka in the telephone book memory 3 is switched to a position at which the pointer 300 is pointing as shown in FIG. 11(c). On the other hand, when the user provides an voice instruction, saying "down", the data (ex. for Tanigawa) stored at an address just after the address storing data of Tanaka in the telephone book memory 3 is switched to a position at which the pointer 300 is pointing as shown in FIG. 11(a).

In step S87, if the Fax function control device 1 determines that a result of voice recognition obtained in step S84 sounds an instruction of originating a call (ex. telephone), the process goes to step S88; otherwise, the process goes to step S90.

In the step S88, the Fax function control device 1 stops the operation of the voice recognition in a same manner as step S38 in FIG. 3 and the process goes to step S89.

The Fax function control device 1 performs a call processing in the step S89. Specifically, the Fax function control device 1 switches the cross-point IC circuit 11 to the handset 8 and the switch 12. The Fax function control device 1 controls the relay driving circuit 13 to closes the switch 12 so that a channel is formed between the handset 8 and the telephone channel 20. Then, a telephone number, which was selected by the up/down key in step S85 and pointed with the pointer 300 on the display unit 5, is transmitted by means of the dialer 109. A telephone conversation starts when the receiving party answers. After that, the process returns to step S1 shown in FIG. 3 through step S28 of FIG. 4, if the hook detection unit 18 detects the on-hook of the handset 8.

In step S90, if the Fax function control device 1 determines that a result of voice recognition obtained in step S84 sounds an instruction of sending a fax (ex. fax), the process goes to step S91; otherwise, the process goes to step S96 (FIG. 8).

In the step S91, the Fax function control device 1 stops the operation of the voice recognition in a same manner as step S38 in FIG. 3 and the process goes to step S92.

If the Fax function control device 1 detects a signal indicating that paper are loaded from the read unit 7 in step S92, the process goes to step S94; otherwise, the process goes to step S93.

In the step S93, the Fax function control device 1 causes the display unit 5 to display a message urging a user to load paper, and the process returns to step S92.

In step S94, the Fax function control device 1 controls the cross-point IC circuit 11 to connect the DAC circuit 15 and the switch 12. The Fax function control device 1 drives the relay driving circuit 13 to closes the switch 12 and so that the modem 108 is connected with the telephone channel 20. Then, a fax number, which was selected with an operation of the up/down key by a user in the step S85 and pointed by the pointer 300 on the display unit 5, is transmitted by means of the dialer 109, thereby transmitting and receiving various fax control signals via the modem 108. Image data read by the read unit 7 is subsequently sent out to the telephone channel 20. After completion of the communication, the process returns to step S65 shown in FIG. 3.

In a manner as described above, when a user inputs voice "up" or "down" from the handset 8, names of the other party and telephone numbers and fax numbers corresponding to the names stored in the telephone book memory 3 are selectively displayed on the display unit 5. If the user inputs voice "telephone" or "fax" from the handset 8 while a desired name of other party are being displayed, a telephone call or fax communication is executed.

This present invention may be structured so that a calling operation is performed in step S89 in a few seconds (ex. three seconds) after the Fax function control device 1 detected a signal indicating that the voice "telephone" was recognized in step S87. Also this present invention may be structured so that a fax transmission is executed with a press of a key for a fax transmission after the Fax function control device 1 detected a signal indicating that voice "fax" was recognized in step S90, thereby allowing the user to have time to identify the receiving party displayed on the display unit.

Following are explanations on operations in a case where voice is not recognized in step S84 shown in FIG. 8.

In step S95 shown in FIG. 8, the Fax function control device 1 reads a current time from the timer 105. If it is determined that five seconds has passed in consideration of the time difference between the time previously stored in step S68 and the current time, the process goes to step S96; otherwise, the process returns to step S71.

In the step S96, the Fax function control device 1 controls the memory 9 so as to add one NG datum to NG data stored in the memory unit 9, then the process goes to step S97.

In the step S97, the Fax function control device 1 reads the number of the NG stored in the memory unit 9. If the number is not smaller than 10, the process goes to step S98. If the number is smaller than 10, the process returns to step S70.

In the step S98, the Fax function control device 1 stops the voice recognition in a same manner as the step S36 shown in FIG. 3, and the process returns to step S65 (FIG. 3).

As described above, in a case where voice is not input from the handset 8 or the voice recognition unit 110 does not recognize the input voice within five seconds after the timer circuit started counting five seconds in step S95, one NG datum is added to the NG data stored in the memory unit 9. When the number of NG reaches ten or more, the voice recognition is stopped.

Such structure can prevent the voice recognition unit 110 to indefinitely execute wasted operations for recognizing voice caused by user's indistinct articulation, ambient noise or user's lack of understanding of voice recognition mechanism.

As described above, the facsimile apparatus in the embodiment does not need any troublesome operations but has an excellent operability because users can execute telephone book searching, call processing and so on by only bringing the handset into off-hook and inputting voice.

Also the apparatus suspends recognizing voice with key entry during voice recognition because the apparatus places higher priority on key entry. Thus even if the user presses keys without his/her being aware of the voice recognition on the job, the user does not need to input voice again and can perform operations corresponding the pressed keys.

Further, when an incoming call comes during voice recognition, the apparatus suspends recognizing voice and allows the user to answer the incoming call, thereby enabling the user to respond surely upon an incoming call. Also, when an incoming call comes during voice recognition, the telephone number of calling party is displayed on a display unit, thereby enabling the user to know who's calling even halfway through the voice recognition.

The present invention can provide telephone apparatus with good usability in that the apparatus immediately suspends voice recognition upon an incoming call during voice recognition and provides notification about the incoming call to a user.

Although descriptions were made on a facsimile apparatus adopting the present invention in the embodiment, of course, the present invention is applicable to a normal telephone apparatus without facsimile function.

The invention claimed is:

1. A telephone apparatus with a function of operating it by voice input, comprising:
    a transmitting/receiving device;
    voice recognition means for performing voice recognition on a voice input from the transmitting/receiving device;
    hook detection means for detecting a hook state of the transmitting/receiving device;
    control means for controlling operations of recognizing voice performed by the voice recognition means;
    first storing means for storing a first flag indicating whether the voice recognition means is enabled to perform voice recognition on a first voice input from the transmitting/receiving device;
    second storing means for storing a second flag indicating whether the voice recognition means is enabled to perform voice recognition on a different voice input from the first voice input from the transmitting/receiving device;
    first input means for setting ON and OFF of the first flag,
    second input means for setting ON and OFF of the second flag;
    wherein the control means controls the voice recognition means to start performing voice recognition on the first voice input, the control means starting voice recognition on the first voice input in response to detecting ON of the first flag stored in the first storing means when the hook detection means detects an off-hook of the transmitting/receiving device,
    wherein the control means controls the second flag to be set ON or OFF by the second input means while the first flag is ON, and controls the second flag to be OFF while the first flag is OFF, and
    wherein the control means controls the voice recognition means to start performing voice recognition on the different voice input from the first voice input, the control means starting voice recognition on the different voice input from the first voice input in response to detecting ON of the second flag stored in the second storing means while the first flag stored in the first storage means is ON.

2. A telephone apparatus with a function of operating it by voice input according to claim 1, further comprising:
    a telephone book memory storing a plurality of data of other parties,
    display means capable of displaying the data of the other parties stored in the telephone book memory; and
    display control means for controlling contents to be displayed on the display means; wherein
    the display control means causes the display means to select data of a first party in the telephone book memory and to display the data of the first party on a basis of a result of recognizing the first voice input from the transmitting/receiving device and recognized by the voice recognition means.

3. A telephone apparatus with a function of operating it by voice input according to claim 2, wherein
    when the voice recognition means recognizes a second voice input from the transmitting/receiving device in a state where data of the first party are being displayed on the display means, the display control means switches the data of the first party displayed on the display means to data of a second party.

4. The telephone apparatus with a function of operating it by voice input according to claim 2 or 3, further comprising:
    information detection means for detecting information of an other party that is transmitted through a telephone channel upon an arrival of an incoming call, wherein
    when the information detection means detects information of the other party while the display means is displaying the other party's data to select, the display means displays the detected information of the other party.

5. The telephone apparatus with a function of operating it by voice input according to any one of claims 1 to 3, further comprising:
    setting change means for changing the first flag stored in the storing means; and
    third input means for inputting an instruction for changing the setting to the setting change means, wherein,
    the setting change means changes the first flag stored in the storing means when the third input means inputs an instruction for changing the setting of the first flag.

6. The telephone apparatus with a function of operating it by voice input according to claim 2, further comprising:
    dial means for originating a call with a dial, wherein
    when the voice recognition means recognizes a third voice input from the transmitting/receiving device in a state where the other party's data are being displayed on the display means, the dial means originates a call with the dial in accordance with the other party's data displayed on the display means.

7. The telephone apparatus with a function of operating it by voice input according to claim 3, further comprising:
    dial means for originating a call with a dial, wherein
    when the voice recognition means recognizes a third voice input from the transmitting/receiving device in a state where the other party's data are being displayed on the display means, the dial means originates a call with the dial in accordance with the other party's data displayed on the display means.

* * * * *